US006929671B2

(12) United States Patent
Kim et al.

(10) Patent No.: US 6,929,671 B2
(45) Date of Patent: Aug. 16, 2005

(54) COMBINATION AIR PURIFIER AND WIND GENERATOR

(76) Inventors: Eung-Pil Kim, 117-802, Kolon A.P.T. Gangsanmaeul #145-4, Deokso-ri, Wabu-eup, Namyangju-si, Kyungki-do, 472-724 (KR); Kwang-Sik Kim, 301 #9-20, Dongja-dong Yongsan-gu, Seoul, 148-818 (KR)

( * ) Notice: Subject to any disclaimer, the term of this patent is extended or adjusted under 35 U.S.C. 154(b) by 0 days.

(21) Appl. No.: 10/478,812

(22) PCT Filed: May 28, 2002

(86) PCT No.: PCT/KR02/01002

§ 371 (c)(1),
(2), (4) Date: Dec. 11, 2003

(87) PCT Pub. No.: WO02/097266

PCT Pub. Date: Dec. 5, 2002

(65) Prior Publication Data

US 2004/0187450 A1 Sep. 30, 2004

(30) Foreign Application Priority Data

May 29, 2001 (KR) .......................................... 2001-29880

(51) Int. Cl.[7] .......................... B01D 29/05; F02B 77/00
(52) U.S. Cl. ....................... 55/385.1; 55/385.2; 55/486; 55/471; 55/473; 290/44; 290/54; 290/55
(58) Field of Search .............................. 55/385.1, 385.2, 55/486, 471, 473; 290/44, 54, 55

(56) References Cited

U.S. PATENT DOCUMENTS

| 4,292,540 A | 9/1981 | Thompson et al. |
| 5,336,933 A | 8/1994 | Ernster |
| 6,298,819 B1 * | 10/2001 | Johnson et al. ......... 123/198 E |
| 6,749,654 B2 * | 6/2004 | Hilliard ..................... 55/385.1 |

FOREIGN PATENT DOCUMENTS

JP 63-230965 9/1988

* cited by examiner

Primary Examiner—Duane Smith
Assistant Examiner—Minh-Chau T. Pham
(74) Attorney, Agent, or Firm—Jordan & Hamburg LLP

(57) ABSTRACT

The present invention relates to a combination air purifier and wind generator. The combination air purifier and wind generator includes a wind-receiving unit installed on a central shaft for driving an electric generator mounted in a housing, and an air purifier. The wind-receiving unit includes a governor fixed to an upper end of the central shaft, a spherical blower installed in the middle of the central shaft, and planar magnetic rotary plates installed at a lower end of the central shaft for receiving both artificial and natural winds. Lower magnets are attached to the top of the housing while upper magnets having the same polarity as the lower magnets are attached to the bottoms of the magnetic rotary plates to face the lower magnets. The air purifier includes two air inlets; one air outlet; a copper net, a silver net and a hard charcoal/zeolite net disposed within the air purifier for purifying air introduced thereinto; and a blower interposed between the silver net and the hard charcoal/zeolite net.

1 Claim, 2 Drawing Sheets

COMBINATION AIR PURIFIER AND WIND GENERATOR

TECHNICAL FIELD

The present invention relates to a combination air purifier and wind generator, and more particularly, to a combination air purifier and wind generator capable of enhancing electricity generation by increasing a rotational force using a natural wind and of simultaneously achieving the electricity generation even in a gentle natural wind or windless state by using an artificial wind generated from an air purifier.

BACKGROUND ART

Generally, studies on a wind generator for generating electricity using a natural wind have been mainly conducted with a wing (impeller) serving as a windmill capable of rotating a shaft of an electric generator even with a gentle natural wind. Most wings have taken the shape of a cylinder or a propeller. However, a wind generator having the cylindrical or propeller-type wing has a problem in that it cannot obtain a rotational force and thus generate the electricity with the gentle natural wind of which intensity is low since the studies have been limited to the angle at which the wing encounters wind resistance.

In order to solve the above problem, the conventional wind generator generates the electricity by forcibly producing an artificial wind using a blower additionally attached thereto. In the electricity generation using the artificial wind from the blower, use of additional electric power in addition to surplus electric power that has been previously stored is avoided in view of the efficiency of electricity generation.

DISCLOSURE OF INVENTION

The present invention is conceived to solve the problems in the conventional wind generator. An object of the present invention is to provide a combination air purifier and wind generator capable of purifying ambient polluted air by using an artificial wind generated by a blower of an air purifier for purifying the air and of simultaneously generating electricity by rotating a central shaft of an electric generator using the artificial wind generated by the blower even in a very gentle natural wind or windless state.

Another object of the present invention is to provide a combination air purifier and wind generator in which even though the intensity of the wind increases, the shaft of the generator is prevented from being accelerated beyond a predetermined speed so that any damage to the generator can be avoided and its life can be prolonged, and which includes a multi-stage wind-receiving unit for causing the shaft to be easily rotated even with the gentle natural wind and the artificial wind from the blower so as to enhance the electricity generation.

According to the present invention for achieving the above objects, there is provided a combination air purifier and wind generator including an electric generator installed in a box-type housing, a central shaft protruding beyond the top of the box-type housing and having a lower end with a gear coupled thereto for engaging with a gear of the electric generator and transmitting a rotational force, and a wind-receiving unit coupled to the central shaft. The wind-receiving unit includes a governor fixed to an upper end of the central shaft, a spherical blower disposed below the governor, and planar magnetic rotary plates disposed below the blower for receiving both artificial and natural winds.

The governor includes a plurality of cylinders of which one ends are fixed to the central shaft, a plurality of wind cups of which one ends are slidably installed within the respective cylinders, and springs connected with the inner ends of the wind cups for elastically supporting them. Lower magnets are attached to the top of the box-type housing, and upper magnets having the same polarity as the lower magnets are disposed on the bottoms of the respective magnetic rotary plates to face down toward the lower magnets. The combination air purifier and wind generator further comprises an air purifier which is fixedly installed on a side of the top of the box-type housing and comprised of two air inlets and one air outlet and in which a copper net, a silver net and a hard charcoal/zeolite net for purifying air are disposed in the air purifier and a blower is disposed between the silver net and the hard charcoal/zeolite net.

BEST MODE FOR CARRYING OUT THE INVENTION

Hereinafter, a preferred embodiment of a combination air purifier and wind generator according to the present invention will be described in detail with reference to the accompanying drawings.

Figure 1:
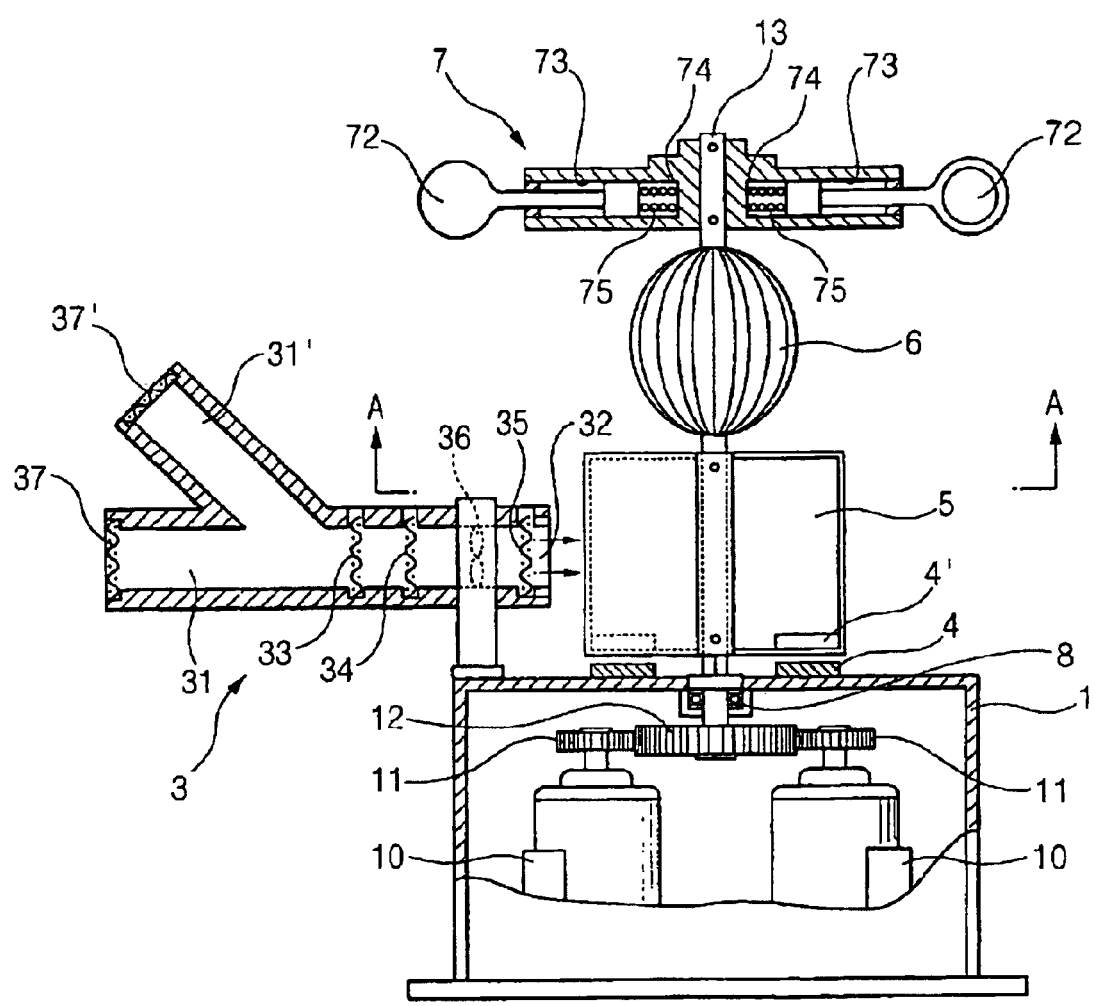
FIG. 1 is a sectional view of a combination air purifier and wind generator according to the present invention.
Figure 2:
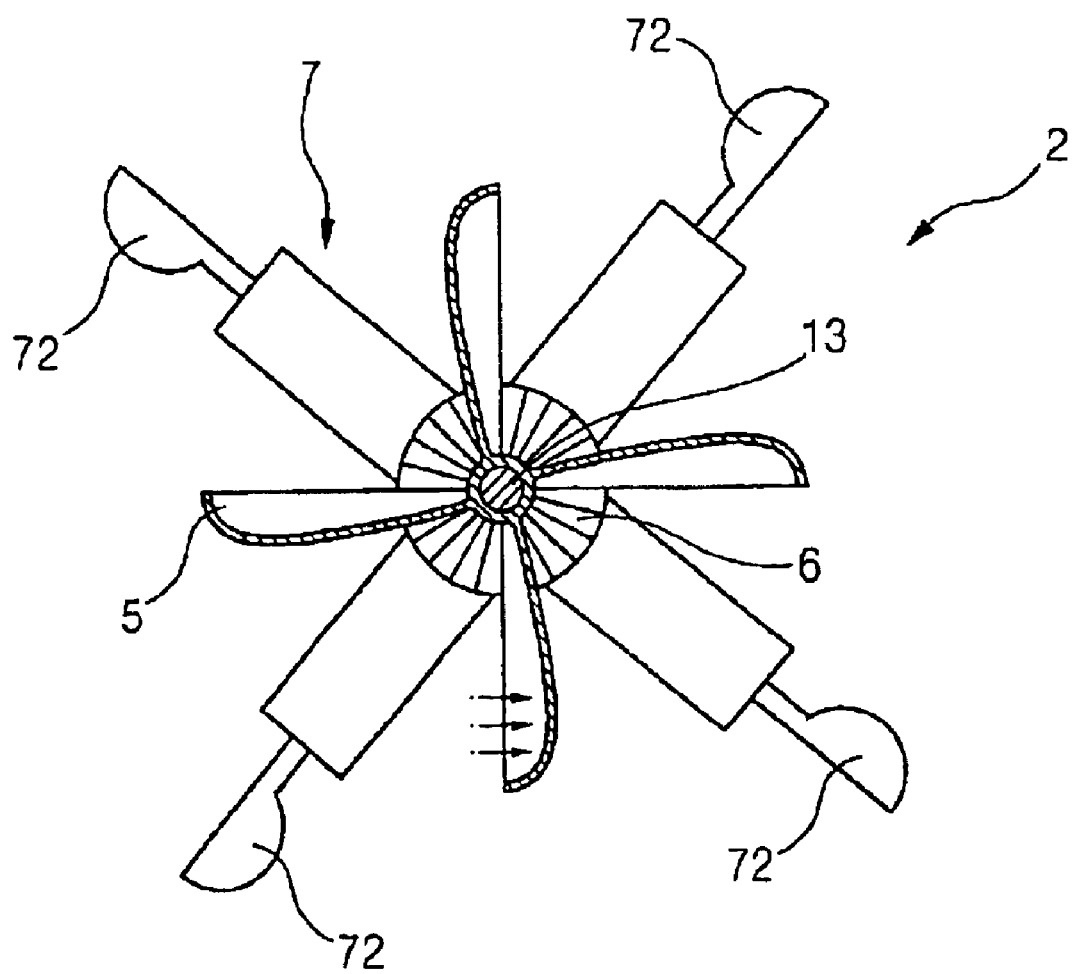
FIG. 2 is a section view taken along line A—A of FIG. 1.

FIGS. 1 and 2 are sectional views of a combination air purifier and magnet-type wind generator according to the present invention. Reference numeral 1 designates a box-type housing, 2 designates a wind-receiving unit, 3 designates an air purifier, and 10 designates an electric generator.

Each of the electric generators 10 is a conventional model for converting mechanical energy into electrical energy. A shaft of the electric generator 10 is coupled with a gear 11.

The electric generator 10 is installed within the box-type housing 1 made of steel frame and plate, or the like. The gear 11 of the electric generator 10 is engaged with and rotated together with a gear 12 coupled with a lower end of a central shaft 13 which penetrates through the center of a top surface of the box-type housing 1 and is positioned in the box-type housing 1. Thus, the gear 11 connected to components for generating electricity, such as a coil and a magnet that are not shown in the figures, within the electric generator 10 converts the mechanical energy into the electrical energy.

The wind-receiving unit 2 installed on the central shaft 13 includes three wind-resistant bodies: a governor 7 fixed to an upper end of the central shaft 13, a spherical blower 6 disposed below the governor, and planar magnetic rotary plates 5 disposed below the blower 6 for receiving both artificial and natural winds.

The governor 7 fixed to the upper end of the central shaft 13 is a horizontal centrifugal rotary body and includes a plurality of cylinders 73 of which one ends are fixed to the central shaft 13, a plurality of wind cups 72 of which one ends are slidably installed within the respective cylinders 73, and springs 75 connected with the inner ends of the wind cups 72 and inner walls 74 of the cylinders 73 for elastically supporting them.

The blower 6 installed in the middle of the central shaft 13 takes the shape of a sphere defined by a plurality of grouped winglets and can obtain a rotational force even with gentle winds generated in all directions. Further, since the blower 6 is disposed in the middle of the central shaft, it can serve to provide a starting force to the central shaft 13 upon existence of the gentle wind while keeping the balance of the central shaft 13, thereby preventing the central shaft 13 from stopping.

Each of the planar magnetic rotary plates 5 installed at a lower portion of the central shaft 13 is made in the form of a rectangular bucket as shown in FIG. 2. Upper magnets 4' are attached to the bottoms of the respective magnetic rotary plates. Repulsive forces are produced between the upper magnets 4' and lower permanent magnets 4 (20,000 gauss or higher) that have the same polarity as the upper magnets and are attached to the top of the box-type housing 1, and thus, a levitation phenomenon occurs therebetween. Accordingly, weights of all the components installed on the central shaft 13 become zero, so that the magnetic rotary plates can be easily rotated even with the gentle wind by means of a rotational action resulting from the repulsive forces between the magnets having the same polarity. Consequently, the rotational ability of the magnetic rotary plates can be improved even under any windy conditions. Particularly, the magnetic rotary plates are constructed to be forcibly rotated with the artificial wind discharged from a blower 36 of the air purifier 3 to be described later, even in the gentle natural wind or windless state.

Moreover, as shown in FIG. 2, the wind cups 72 of the governor 7 and the magnetic rotary plates 5 are staggered so that the wind sequentially and consecutively encounters the wind cups 72 and the magnetic rotary plates 5. Thus, a continuous rotational force is transmitted to the central shaft 13.

The air purifier 3 is fixedly installed on a side of the top of the box-type housing 1 and is Y-shaped by including two air inlets 31, 31' and one air outlet 32. One of the air inlets 31 is horizontally in line with the air outlet 32 while the other air inlet 31' is formed to incline upward, so that a wind can be generated due to a change in ambient airflow resulting from drawn air streams and a discharged air stream. Further, a copper net 33, a silver net 34 and a hard charcoal/zeolite net 35 for purifying the polluted air are disposed to be spaced apart from one another at predetermined intervals within the air purifier so that the polluted air is caused to pass through them and to be purified. The blower 36 is interposed between the silver net 34 and the hard charcoal/zeolite net 35 so that the air is forced to be drawn and discharged. Mosquito nets 37, 37' can be installed at the air inlets 31, 31' to prevent insects from entering the air purifier.

Reference numeral 8, which has not yet been explained, designates a bearing for ensuring smooth rotation of the central shaft 13.

Next, the operation of the combination air purifier and wind generator according to the present invention will be described.

When the box-type housing 1 of the combination air purifier and wind generator is installed at a desired location such as the interior of a room or a roadside, a no-load state suitable for rotation of the central shaft 13 is achieved by means of the repulsive forces between the upper magnets 4' in the magnetic rotary plates 5 and the lower magnets 4 attached to the box-type housing 1. Thus, even though a very gentle wind encounters the blower 6, the wind cups 72 of the governor 7 and the magnet rotary plates 5, the central shaft 13 immediately begins to be rotated and is further accelerated by the action of the repulsive forces between the lower and upper magnets 4, 4'. Accordingly, the desired electricity can be easily obtained through the electric generators 10.

In order to reduce loads and cause the rotational speed of the central shaft 13 to reach a normal rotational speed in a short time upon initial rotation of the central shaft 13, the wind cups 72 of the governor 7 are maintained in a state where they are pulled toward the central shaft 13 by the springs 75. The wind cups 72 are kept in the initial starting state without any change in their state so as to facilitate the rotation of the central shaft 13 until rated electricity is provided through normal electricity generation.

The initial rotation of the central shaft is facilitated even with the gentle wind by means of the repulsive forces between the lower and upper magnets 4, 4', the inward positioned state of the wind cups 72, and the spherical blower 6. Further, the magnetic repulsive forces and the inward positioned state of the wind cups 72 continuously assist the central shaft 13, which has begun to be rotated, to cause its rotation speed to reach the rotational speed at which the desired rated electricity can be generated.

Meanwhile, if the intensity of the wind is increased in a state where the rotational speed of each electric generator 10 reaches a normal rotational speed, the rotational speed of the central shaft 13 is also increased and thus the electric generator may be burdened with an overload.

In order to protect the electric generator 10 against the overload, if the central shaft 13 is rotated with a rotational force larger than a predetermined rotational force, the wind cups 72 of the governor 7 are urged outward from the center of the central shaft 13 by centrifugal forces to reduce its rotational force. On the contrary, if the rotational force of the central shaft 13 begins to be reduced, the wind cups 72 are pulled toward the central shaft by means of the restoring forces of the springs 75 so as to reduce the centrifugal forces. Therefore, it is possible to always maintain the normal rotational speed of the central shaft 13.

Meanwhile, in the very gentle natural wind state or the windless state, the blower 36 of the air purifier 3 is operated using either electric power, which has been generated by the electric generators 10 and then stored, or separate electric power. With the operation of the blower 36, the ambient polluted air is caused to be introduced into the air inlets 31, 31'. This causes a change in airflow thereabouts which in turn generates a wind. The introduced polluted air is purified by passing through the copper net 33, the silver net 34 and the hard charcoal/zeolite net 35, which are disposed within the air purifier. The purified air is discharged and then causes the magnetic rotary plates 5 to be rotated as shown in FIG. 2. As the magnetic rotary plates 5 are rotated, the blower 6 and the governor 7 installed above the magnetic rotary plates are rotated together therewith to increase the rotational force. Finally, the central shaft 13 operates the electric generators 10 so that the electricity is generated.

According to the combination air purifier and wind generator, its structure is simplified and the central shaft coupled with the shafts of the electric generators can be rotated even with the gentle wind owing to the increase in the initial starting force by means of the repulsive forces between the upper and lower magnets. Further, even though the intensity of the wind increases, the shafts of the electric generators are prevented from being accelerated beyond the predetermined rotational speed to be always kept at the predetermined rotational speed. Thus, any damage to the electric generators can be avoided and their lives can be prolonged. Moreover, the combination air purifier and wind generator is very useful in that both the purification of the ambient polluted air and the electricity generation can be simultaneously performed by operating the wind-receiving unit with the natural wind and the artificial wind generated by the blower regardless of the amount, velocity and direction of the wind.

What is claimed is:

1. A combination air purifier and wind generator including an electric generator installed in a housing, a central shaft protruding beyond the top of the housing and having a lower end with a gear coupled thereto for engaging with a gear of the electric generator and transmitting a rotational force, and a wind-receiving unit coupled to the central shaft, wherein:

the wind-receiving unit includes a governor fixed to an upper end of the central shaft, a spherical blower disposed below the governor, and planar magnetic rotary plates disposed below the blower for receiving both artificial and natural winds;

the governor includes a plurality of cylinders of which one end of each is fixed to the central shaft, a plurality of wind cups of which one end of each is slidably installed within the respective cylinders, and springs connected with the inner ends of the wind cups for elastically supporting them;

lower magnets are attached to the top of the housing, and upper magnets having the same polarity as the lower magnets are disposed on the bottoms of the respective magnetic rotary plates to face down toward the lower magnets: and the combination air purifier and wind generator further comprises an air purifier which is fixedly installed on a side of the top of the housing and comprised of two air inlets and one air outlet and in which a copper net, a silver net and a hard charcoal/zeolite net for purifying air are disposed and a blower is disposed between the silver net and the hard charcoal/zeolite net.

* * * * *